United States Patent [19]
Voss

[11] 4,377,211
[45] Mar. 22, 1983

[54] MULTI-PURPOSE GARDEN HOE

[75] Inventor: Raymond G. Voss, East Moline, Ill.

[73] Assignee: Eagle Valley Manufacturing, Inc., Eldridge, Iowa

[21] Appl. No.: 310,453

[22] Filed: Oct. 13, 1981

[51] Int. Cl.³ .............................................. A01B 1/20
[52] U.S. Cl. ...................................... 172/375; 172/381
[58] Field of Search ............... 172/371, 375, 376, 381; D8/6, 7, 9, 11

[56] References Cited

U.S. PATENT DOCUMENTS

| D. 25,918 | 8/1896 | Hepsher | D8/11 |
|---|---|---|---|
| 162,596 | 4/1875 | Acker | 172/375 |
| 946,322 | 1/1910 | Blake | 172/371 |
| 1,122,484 | 12/1914 | Dahl | 172/381 |
| 1,946,006 | 2/1934 | Struckmeyer | 172/375 |
| 2,100,221 | 11/1937 | Kofoed | 172/375 |
| 2,147,980 | 2/1939 | Koenig | 172/376 |
| 3,915,240 | 10/1975 | Pittman | 172/371 |
| 3,965,990 | 6/1976 | Pittman | 172/375 |

FOREIGN PATENT DOCUMENTS

| 19297 | 9/1914 | Denmark | 172/375 |
|---|---|---|---|
| 228384 | 11/1943 | Switzerland | 172/376 |

Primary Examiner—Richard T. Stouffer
Attorney, Agent, or Firm—Haven E. Simmons

[57] ABSTRACT

A garden hoe features a wide cutting edge for normal hoeing, at one end of which is a pair of cutting edges meeting at a right angle for bordering a garden or a walk and at the other end of which is a short cutting edge for chopping or trenching. A hooked cutting edge for pruning is also incorporated in the hoe which may have a long or short handle.

9 Claims, 4 Drawing Figures

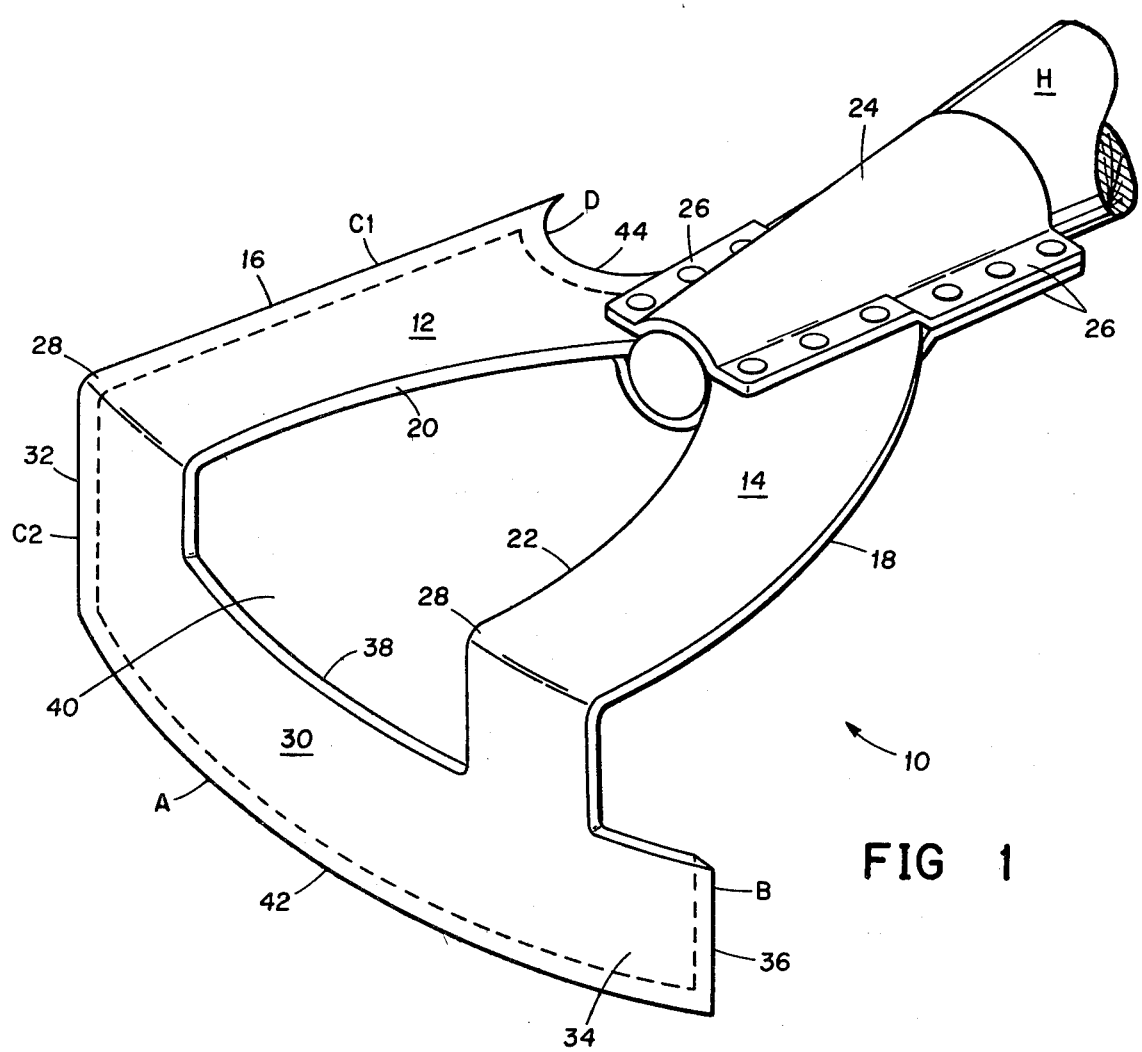
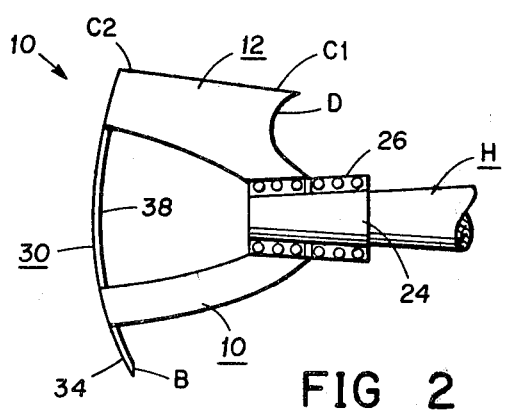
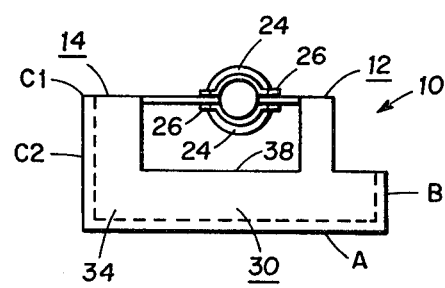
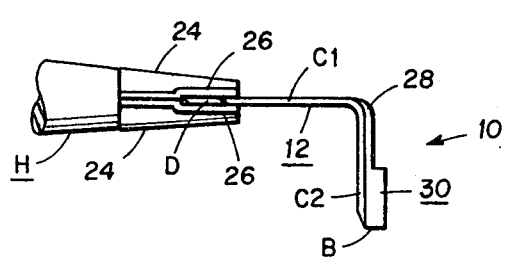
FIG 1
FIG 2
FIG 3
FIG 4

MULTI-PURPOSE GARDEN HOE

BACKGROUND OF THE INVENTION

There are many versions of the conventional garden hoe which perform various operations besides normal hoeing. Some of these are shown in U.S. Pat. Nos. 162,596; 946,322; 1,946,006; 2,100,221; 3,915,240; and 3,965,990, for instance. But none of these, nor any other so far as is known, can also conveniently and readily perform operations such as edging or bordering of gardens and walks and the like as well as other cutting operations such as chopping and pruning. So it is the chief object of the present invention to provide a novel and readily fabricated hoe which can deftly perform a wide variety of useful cutting operations in addition to normal hoeing.

SUMMARY OF THE INVENTION

The hoe of the invention is formed from plate material and includes a wide transverse blade of arcuate shape in plan view and relatively shallow in height. The lower edge of the blade performs normal hoeing operations while a short vertical edge at one end serves for chopping and similar operations, such as penetrating very hard soil. The blade is supported from the handle by a pair of splayed, horizontal legs downwardly bent at their outer ends and integrally joined with the top of the blade. The other end of the blade in effect forms a vertical continuation of the horizontal portion of one leg so that the two produce a pair of edges meeting at a right angle for bordering gardens, walks and the like as well as other chopping and grooving operations. One of the legs also incorporates a hooked, rearwardly opening concave edge for light pruning operations. The hoe may be equipped with a long handle for use in a standing position or with a short handle for use in a kneeling position.

Other features and advantages of the invention will become apparent from the drawings and the more detailed description which follows.

BRIEF DESCRIPTION OF THE DRAWINGS

FIG. 1 is a perspective view of a hoe according to the invention.

FIG. 2 is a plan view of the head of the hoe of FIG. 1, while FIGS. 3 and 4 are front and side elevations of the same.

DETAILED DESCRIPTION OF THE PREFERRED EMBODIMENT

Essentially the hoe of the invention consists of a head 10 and a handle H, the head 10 being formed from suitable steel plate shaped to provide a pair of legs 12 and 14, the former having an outer straight edge 16 and the latter an outer convex edge 18 while both have inner concave edges 20 and 22, respectively. The legs 12 and 14 are forwardly splayed from a tapered ferrule 24 fabricated in two halves by stamping, the rear ends of the legs 12 and 14 being sandwiched between respective pairs of lateral flanges 26 along the two ferrule halves, the latter and the legs 12 and 14 being secured by spot welds. The ferrule 24 thus forms the rear of the head 10 and the legs 12 and 14 lie generally in a plane through the axis of the handle H. The forward ends of the legs 12 and 14 are downwardly bent at 28 at a right angle and integrally joined by a transverse shallow blade 30 perpendicular to the foregoing plane. One end edge 32 of the blade 30 is formed to be in effect an angled continuation of the outer edge 16 of the leg 12 as well as perpendicular to the plane of both legs 12 and 14. The other end of the blade 30, however, is extended beyond the outer edge 18 of the leg 14 to form a short rectangular spade 34 whose outer edge 36 is also perpendicular to the plane of the legs 12 and 14.

The upper edge 38 of the blade 30 thus forms a large, generally triangular shaped opening 40 with the inner leg edges 20 and 22, and the blade 30 is forwardly bowed so that its lower edge 42 both arcuately intersects and lies is a plane parallel to but offset from the plane of the legs 12 and 14. The rear portion of the leg 12 is laterally enlarged to form a rearwardly opening, hooked edge 44 extending generally transversely between the adjacent end of the edge 16 of the leg 12 and the ferrule 24. Finally, the edges 42, 36, 16 and 32, and 44 are all beveled as indicated to form cutting edges A, B, C1 and C2, and D, respectively, the two edges C1 and C2 adjoining each other at a right angle at the bend 28 of the leg 12.

When the head 10 is fitted with a handle H of, say, four feet in length so that the hoe can be used from a standing position, the cutting edge A is employed in the usual manner for conventional hoeing, shearing of weeds, and breaking up of crusty soil. For this purpose, in a prototype of the hoe, the blade 30 has an overall width of about six inches, a height of about one inch and is disposed about $2\frac{1}{2}$ inches forward of the ferrule 24, the overall height of the head 10 also being about $2\frac{1}{2}$ inches. The curvature of the edge A provides ready penetration of hard ground and a shearing action which easily severs tough weed stalks. The shallow height of the blade 30 and the large opening 40 allow weeds and soil to pass easily through without damming up behind the blade 30. If leveling of the ground after hoeing is necessary, the handle H can be dropped down so that the edge A is in contact with the ground throughout substantially its entire length, inasmuch as the edge A, unlike its equivalent in many other hoes, is curved in one dimension only, being flat with respect to the plane through the legs 12 and 14 and the handle H. Here again the shallow height of the blade 30 allows long, horizontal leveling strokes without pulling along large quantities of soil ahead of it.

By turning the hoe one way about the axis of the handle H, the short cutting edge B can be used to penetrate extremely hard soil as well as for chopping into and prying out heavily rooted weeds. By using a combination of edges A and B weeds can be removed from difficult areas, such as between plants, under the edge of rocks or overhanging foliage, etc. Then by turning the hoe the other way the cutting edges C1 and C2 can be brought into play to border a garden or a walk, the edge C1 cutting the border or along the walk and the two edges together producing a neat, somewhat "V"-shaped groove. The groove can then be cleaned up, and also deepened to sever roots and inhibit their regrowth, with the edge B by turning the hoe so that the edge A lies in a vertical plane. In that case the bent end of the leg 14 adjacent the space 34 can rest atop the ground or the walk and thus provides a depth gauge to produce a neat, precise trench in the ground or along the walk.

The edges C1 and C2 can also be used for other chopping operations. For example, vertical stalks can be cut with the edge C1 by swinging the hoe in a horizontal arc, much like a hatchet or an axe. By swinging the hoe in a vertical arc, like a mattock, the edge C2 can chop horizontal stems and stalks. The two edges C1 and C2, plus the hooked cutting edge D, also allow a wide variety of pruning operations to be easily performed. A smaller version of the head 10, having an overall width of its blade 30 of, say, four inches, and fitted with a short handle H of 16 inches, for example, can accomplish all of the foregoing from a kneeling or crouching position where careful hoeing is required. In short, the hoe of the present invention is a most versatile and effective implement with all of its features present in a very compact arrangement.

Hence, though the present invention has been described in terms of a particular embodiment, being the best mode known of carrying out the invention, it is not limited to that embodiment alone. Instead, the following claims are to be read as encompassing all adaptations and modifications of the invention falling within its spirit and scope.

I claim:

1. In a hand wieldable implement of the hoe type, the implement including a handle having a front end and a generally longitudinal axis, and a cutting head having forward and rear portions, the head rear portion being secured to the handle front end, the head forward portion including a first blade having a surface extending transversely both of said axis and of a first plane through said axis, the first blade having a first cutting edge formed along one margin thereof and lying in the surface of the first blade, the first cutting edge extending generally parallel to said first plane, the first blade also having opposite end margins extending transversely of said first plane, the improvement including second and third cutting edges, the second cutting edge being formed along one of the first blade end margins and lying in the surface of the first blade, one end of the second cutting edge adjoining one end of the first cutting edge at a first angle to form an exterior corner of the first blade, the head forward portion including a second blade having a surface and an exterior margin, said exterior margin adjoining the other end of the second cutting edge and extending rearwardly therefrom transversely of the surface of the first blade, the third cutting edge being formed along said exterior margin of the second blade and lying in the surface thereof, one end of the third cutting edge thereby adjoining said other end of the second cutting edge at a second angle.

2. The implement of claim 1 wherein the first cutting edge arcuately intersects a second plane parallel to and offset from said first plane.

3. The implement of claim 2 wherein the first cutting edge also lies in said second plane.

4. The implement of claim 3 wherein each of said first and second angles is substantially a right angle.

5. The implement of claim 4 including a fourth cutting edge disposed along the other end margin of the first blade and lying in the surface of the first blade, one end of the fourth cutting edge adjoining the other end of the first cutting edge at a third angle to form another exterior corner of the first blade, the length of the fourth cutting edge being materially less than that of the first cutting edge.

6. The implement of claim 5 wherein the fourth angle is substantially a right angle and the fourth cutting edge is generally parallel to the second cutting edge.

7. The implement of claim 5 or 6 wherein the cutting head includes a plate member integrally formed to provide a pair of leg portions forwardly splayed from the head rear portion and joined at their forward ends by a transverse portion constituting the first blade with the first and second cutting edges formed thereon as aforesaid, whereby the leg portions and the first blade define an opeining in the cutting head for passage of debris; wherein one of the leg portions adjoins one transverse end of the first blade and constitutes the second blade with the third cutting edge formed thereon as aforesaid; and wherein the other transverse end of the first blade extends transversely beyond the other leg portion with the fourth cutting edge formed thereon as aforesaid.

8. The implement of claim 7 wherein one of the leg portions includes a fifth cutting edge having a hooked shape opening in a generally rearwardly direction.

9. The implement of claim 8 wherein the leg portions lie generally in said first plane but have their forward ends bent transversely toward said second plane to thereby constitute part of the first blade.

* * * * *